(12) United States Patent
Ashikaga et al.

(10) Patent No.: US 7,082,008 B2
(45) Date of Patent: Jul. 25, 2006

(54) SERVO PATTERN DEVIATION CORRECTING METHOD AND DISK APPARATUS USING THE SAME

(75) Inventors: Hiroshi Ashikaga, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 09/957,598

(22) Filed: Sep. 20, 2001

(65) Prior Publication Data

US 2002/0109933 A1 Aug. 15, 2002

(30) Foreign Application Priority Data

Feb. 15, 2001 (JP) ........................ 2001-039250

(51) Int. Cl.
*G11B 5/596* (2006.01)

(52) U.S. Cl. ........................ 360/77.04; 360/48

(58) Field of Classification Search ............... 360/75, 360/77.04, 77.08, 77.01
See application file for complete search history.

(56) References Cited

U.S. PATENT DOCUMENTS

| | | | | |
|---|---|---|---|---|
| 5,793,559 A | * | 8/1998 | Shepherd et al. | 360/78.09 |
| 5,825,578 A | * | 10/1998 | Shrinkle et al. | 360/77.08 |
| 5,859,740 A | * | 1/1999 | Takeda et al. | 360/77.02 |
| 5,867,343 A | * | 2/1999 | Le et al. | 360/77.08 |
| 6,049,440 A | * | 4/2000 | Shu | 360/77.04 |
| 6,606,216 B1 | * | 8/2003 | Liikanen et al. | 360/77.08 |

FOREIGN PATENT DOCUMENTS

| | | |
|---|---|---|
| JP | 07-078321 | 3/1995 |
| JP | 07-334932 | 12/1995 |

\* cited by examiner

*Primary Examiner*—David Hudspeth
*Assistant Examiner*—Daniell L. Negrón
(74) *Attorney, Agent, or Firm*—Greer, Burns & Crain, Ltd.

(57) ABSTRACT

In a servo pattern deviation correcting method and disk apparatus of the present invention, a read/write head writes information to a disk and reads information from the disk. Servo pattern blocks are written to respective sectors of the disk along a target track. A deviation of each servo pattern block from a position of the track in a transverse direction is detected. A deviation correction pattern for each servo pattern block is created based on the deviation of the servo pattern block. The deviation correction pattern is written to a predetermined region of the disk between each servo pattern block and a data region along the track. The deviation correction pattern is read from the predetermined region of the disk, so that the read/write head is shifted to a deviation-corrected position on the track based on the servo pattern block and the deviation correction pattern.

16 Claims, 10 Drawing Sheets

SERVO PATTERN DEVIATION CORRECTING METHOD AND DISK APPARATUS USING THE SAME

BACKGROUND OF THE INVENTION

1. Field of the Invention

The present invention generally relates to a servo pattern deviation correcting method and a disk apparatus using the same. More particularly, the present invention relates to a servo pattern deviation correcting method which corrects the positioning of a read/write head even when deviation of a servo pattern from the position of a target track of a disk occurs, and to a disk apparatus which uses the servo pattern deviation correcting method.

2. Description of the Related Art

In a conventional disk apparatus, a servo pattern is written to a disk through a servo track writing (STW) or the like. When data is read from or written to a target track of a disk, the head is placed at the right position on the track in accordance with position information obtained from the servo pattern recorded in the disk. However, the actual track that is actually produced by the head during the rotation of the disk (hereinafter, called the trace of the head) is likely to deviate from the position of the target track due to repeatable run-out caused by the oscillation of the head during the servo track writing.

Figure 1:
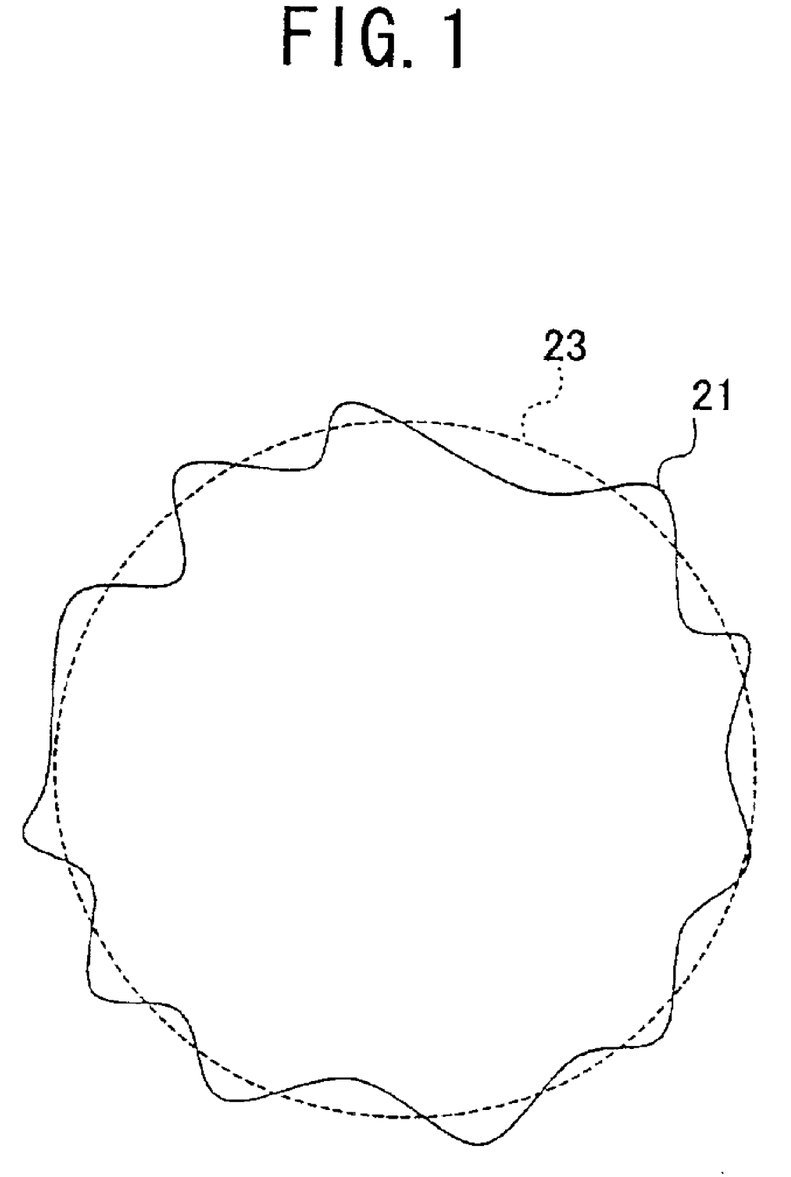
FIG. 1 is a diagram for explaining a positional relationship between the trace of a head and an target track of a disk.
Figure 2:
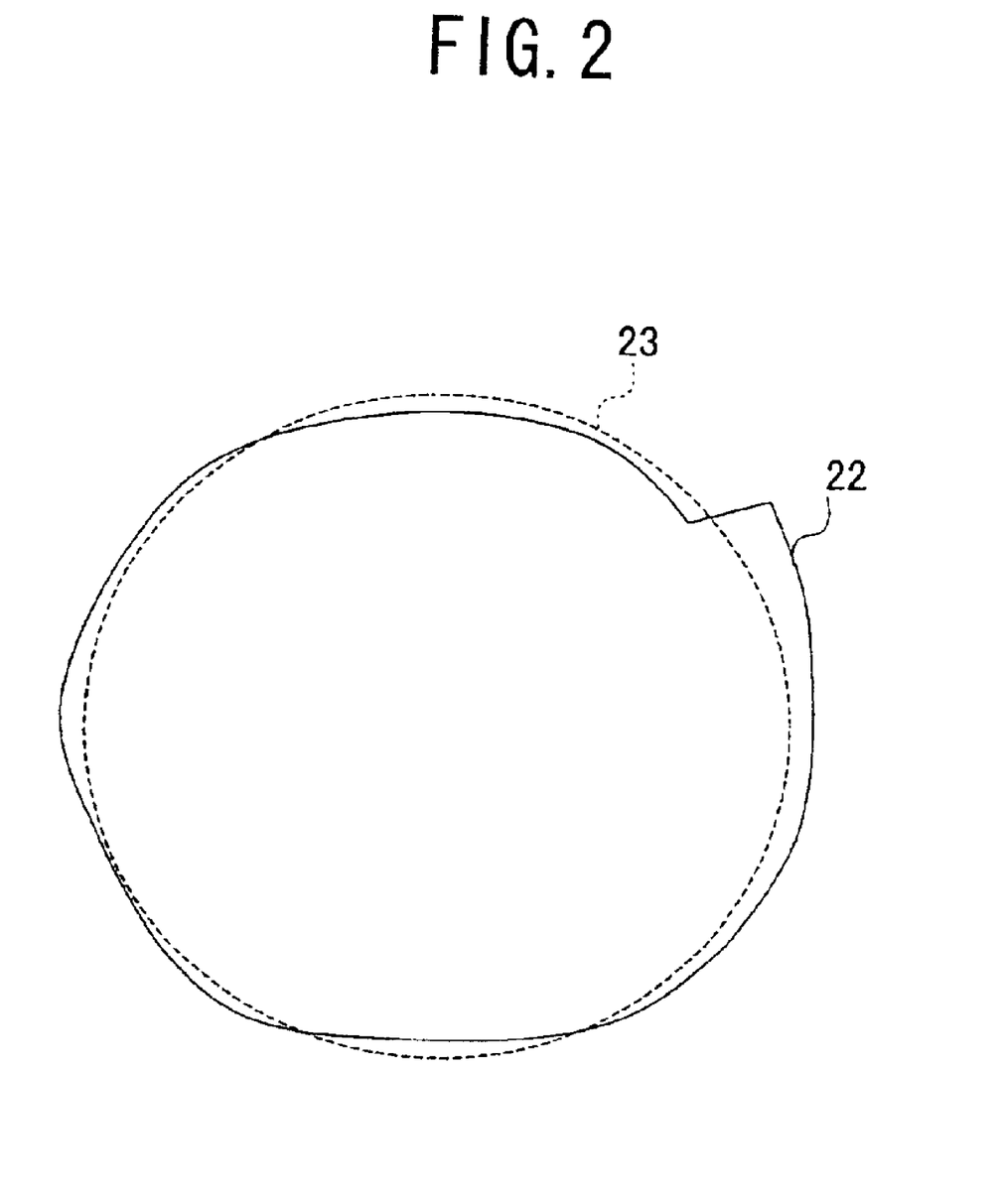
FIG. 2 is a diagram for explaining a positional relationship between the trace of a head and an target track of a disk.

For example, FIG. 1 shows a positional relationship between the trace of the head and the target track of the disk in a certain situation. As indicated by the solid line in FIG. 1, the servo pattern 21 is written to the disk along the target track 23 (indicated by the dotted line) at positions that are irregularly separated from the target track 23. FIG. 2 shows a positional relationship between the trace of the head and the target track of the disk in another situation. As indicated by the solid line in FIG. 2, the starting position of the servo pattern 22 at the start of the writing significantly deviates from the end position of the servo pattern 22 at the end of the writing.

As described above, the head is positioned to the target track in accordance with the position information obtained from the servo pattern of the disk. When such servo pattern deviation occurs, it is difficult for the conventional disk apparatus to accurately place the head to the right position on the track.

SUMMARY OF THE INVENTION

An object of the present invention is to provide a servo pattern deviation correcting method that reliably corrects the positioning of a read/write head even when the servo pattern deviation occurs so as to allow the head to be accurately placed to the right position on the target track.

Another object of the present invention is to provide a disk apparatus using a servo pattern deviation correcting method that reliably corrects the positioning of a read/write head even when the servo pattern deviation occurs so as to allow the head to be accurately placed to the right position on the target track.

The above-mentioned objects of the present invention are achieved by a servo pattern deviation correcting method which is executed by a disk apparatus having a read/write head including a write head and a read head, the write head writing information to a disk and the read head reading information from the disk, the method comprising the steps of: writing servo pattern blocks to respective sectors of the disk along a target track of the disk; detecting a deviation of each servo pattern block from a position of the track in a transverse direction; creating a deviation correction pattern for each servo pattern block based on the deviation of the servo pattern block; writing the deviation correction pattern for each servo pattern block to a predetermined region of the disk between the servo pattern block and a data region along the track; and reading the deviation correction pattern from the predetermined region of the disk for each servo pattern block, so that the read head and the write head are shifted to deviation-corrected positions on the target track based on the servo pattern block and the deviation correction pattern.

The above-mentioned objects of the present invention are achieved by a disk apparatus including a read/write head which includes a write head and a read head, the write head writing information to a disk, the read head reading information from the disk; a head actuation mechanism which shifts the read/write head in a radial direction of the disk to a target track of the disk; and a control unit which controls the read/write head and the head actuation mechanism, the control unit executing a servo pattern deviation correcting method by controlling the read/write head and the head actuation mechanism, the disk apparatus comprising: a first device that causes the write head to write servo pattern blocks to respective sectors of the disk along the track; a second device which causes the control unit to detect a deviation of each servo pattern block from a position of the track in a transverse direction; a third device which causes the control unit to create a deviation correction pattern for each servo pattern block based on the deviation of the servo pattern block; a fourth device which causes the write head to write the deviation correction pattern for each servo pattern block to a predetermined region of the disk between the servo pattern block and a data region along the track; and a fifth device which causes the read head to read the deviation correction pattern from the predetermined region of the disk for each servo pattern block, so that the control unit controls the head actuation mechanism based on the servo pattern block and the deviation correction pattern, so as to shift the read/write head to a deviation-corrected position on the target track.

The above-mentioned objects of the present invention are achieved by a servo pattern deviation correcting method which is executed by a disk apparatus having a read/write head including a write head and a read head, the write head writing information to a disk and erasing information on the disk, the read head reading information from the disk, the method comprising the steps of: writing servo pattern blocks to respective sectors of the disk along a target track of the disk; detecting a deviation of each servo pattern block from a position of the track in a transverse direction; creating a deviation correction pattern for each servo pattern block based on the deviation of the servo pattern block; erasing information in a predetermined region of the disk between the servo pattern block and a data region along the track; writing the deviation correction pattern for each servo pattern block to the predetermined region of the disk; and reading the deviation correction pattern from the predetermined region of the disk for each servo pattern block, so that the read head and the write head are shifted to deviation-corrected positions on the target track based on the servo pattern block and the deviation correction pattern.

In the servo pattern deviation correcting method and the disk apparatus of the present invention, the deviation correction pattern is created based on the deviation of the servo pattern and written to the predetermined region between the servo pattern block and the data region along the track. The servo pattern deviation correcting method and the disk apparatus of the present invention are effective in accurately placing the read/write head at the right position on the target track even when the servo pattern deviation occurs.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

Before the preferred embodiments of the present invention are explained, a description will now be given of a magnetic disk drive to which the present invention is applied, with reference to FIG. 3A, FIG. 3B and FIG. 4.

Figure 3A:
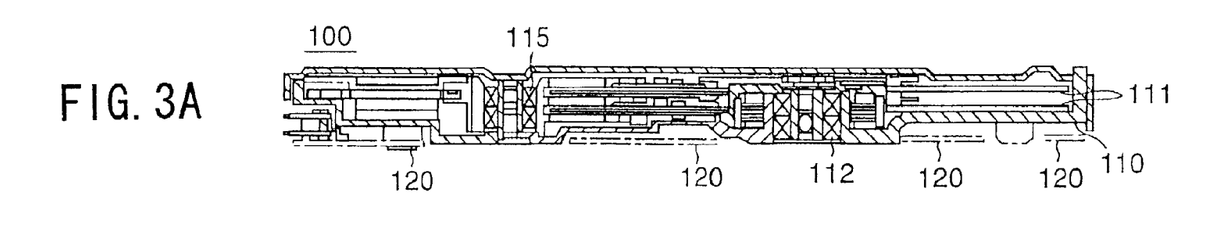
FIG. 3A and FIG. 3B are diagrams showing a magnetic disk drive.
Figure 3B:
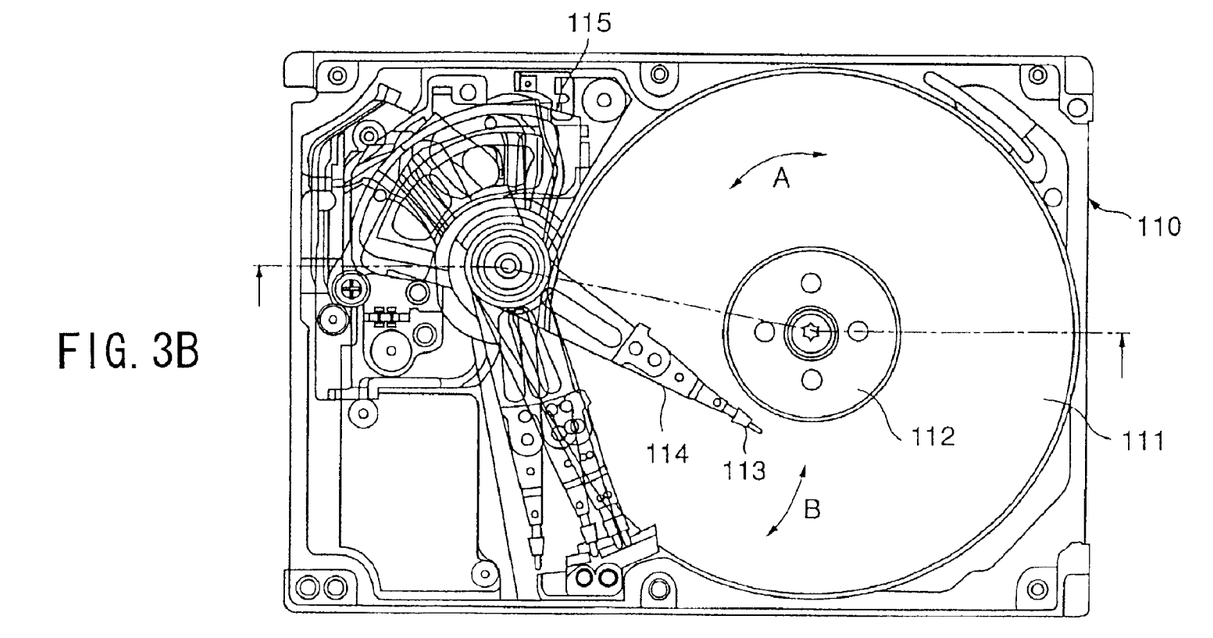

As shown in FIG. 3A and FIG. 3B, the magnetic disk drive 100 generally includes a disk enclosure (DE) 110 and a printed circuit board (PCB) 120. The magnetic disk drive 100 is, for example, a hard disk drive (HDD).

In the disk enclosure 110, a magnetic disk 111, a spindle motor (SPM) 112, a magnetic read/write head 113, an arm 114, and a voice coil motor (VCM) 115 are provided. In a case of the hard disk drive (HDD), a plurality of magnetic disks are rotated by a spindle motor at the same time. However, in the following description, such magnetic disks are collectively referred to as the magnetic disk 111, for the sake of convenience of description.

In the magnetic disk drive 100, the printed circuit board 120 supplies a drive signal to the spindle motor 112 so that the spindle motor 112 is driven to rotate the magnetic disk 111 around the central axis of the spindle motor at a constant velocity in a rotation direction indicated by the arrow A in FIG. 3B. The printed circuit board 120 supplies a drive signal to the voice coil motor 115 so that the voice coil motor 115 is driven to swing or rotate the arm 114 around the central axis of the voice coil motor in a rotation direction indicated by the arrow B in FIG. 3B. The read/write head 113 is attached to the leading edge of the arm 114. By the movement of the arm 114 in the direction B, the read/write head 113 at the leading edge of the arm 114 is moved in a radial direction of the disk 111. During a tracking control, the printer circuit board 120 controls the voice coil motor 115 to move the arm 114 in the direction B, so that the head 113 is shifted in the radial direction of the disk 111 to a target track through the movement of the arm 114.

In the present embodiment, the read/write head 113 includes a read head 113r and a write head 113w, and the read head 113r and the write head 113w are arranged such that they are spaced apart from each other along the track of the disk.

Figure 4:
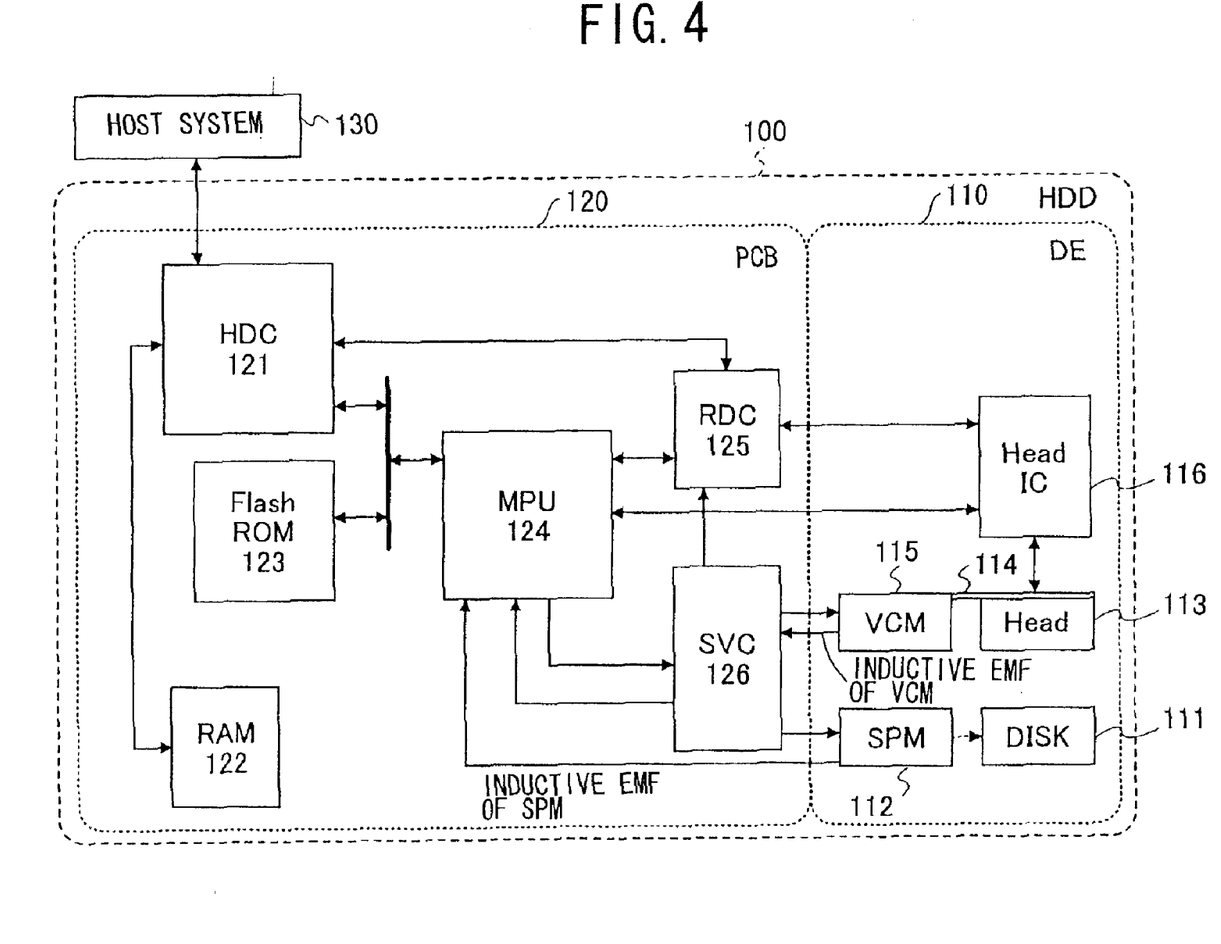
FIG. 4 is a block diagram of a control section of the magnetic disk drive.

As shown in FIG. 4, the disk enclosure (DE) 110 further includes a head controller (Head IC) 116. During a read operation, the head 113 electromagnetically generates a readout signal from the disk 111 and supplies the readout signal to the head controller 116. The head controller 116 amplifies the readout signal received from the head 113. The amplified readout signal from the head controller 116 is supplied to the printed circuit board 120. During a write operation, the head controller 116 amplifies a writing signal that is to be recorded in the disk 111, and supplies the amplified writing signal to the read/write head 113.

As shown in FIG. 4, in the printed circuit board (PCB) 120, a hard disk controller (HDC) 121, a random access memory (RAM) 122, a flash read-only memory (Flash ROM) 123, a microprocessor unit (MPU) 124, a read channel (RDC) 125, and a servo controller (SVC) 126 are provided.

As described above, the servo controller (SVC) 126 of the PCB 120 controls, during the tracking control, the voice coil motor 115 to move the arm 114 in the direction B, so that the head 113 is shifted in the radial direction B to the target track through the movement of the arm 114. Hence, the voice coil motor 115 and the arm 114 in the disk apparatus 100 of the present embodiment form a head actuation mechanism that shifts the read/write head 113 in a radial direction of the disk to the target track of the disk.

In the disk apparatus 100 of the present embodiment, the read head 113r generates a readout signal from the disk 111 during a read operation, and the readout signal from the read head 113r is amplified by the head controller 116. The amplified readout signal, output by the head controller 116, is supplied to the hard disk controller (HDC) 121 through the read channel 125 in the printed circuit board (PCB) 120. The amplified readout signal is subjected to a decoding process at the HDC 121. The HDC 121 supplies the readout information, which is produced through the decoding process from the amplified readout signal, to an external host system 130.

Further, writing information is supplied from the host system 130 to the HDC 121 during a write operation. The writing information is subjected to an encoding process at the HDC 121. The HDC 121 supplies the encoded signal, which is produced through the encoding process from the writing information, to the head controller 116 of the disk enclosure (DE) 110 via the read channel 125. The encoded signal is amplified by the head controller 116. The head controller 116 supplies the amplified signal to the write head 113w, so that the writing information is electromagnetically recorded in the disk 111 by the write head 113w.

Figure 5A:
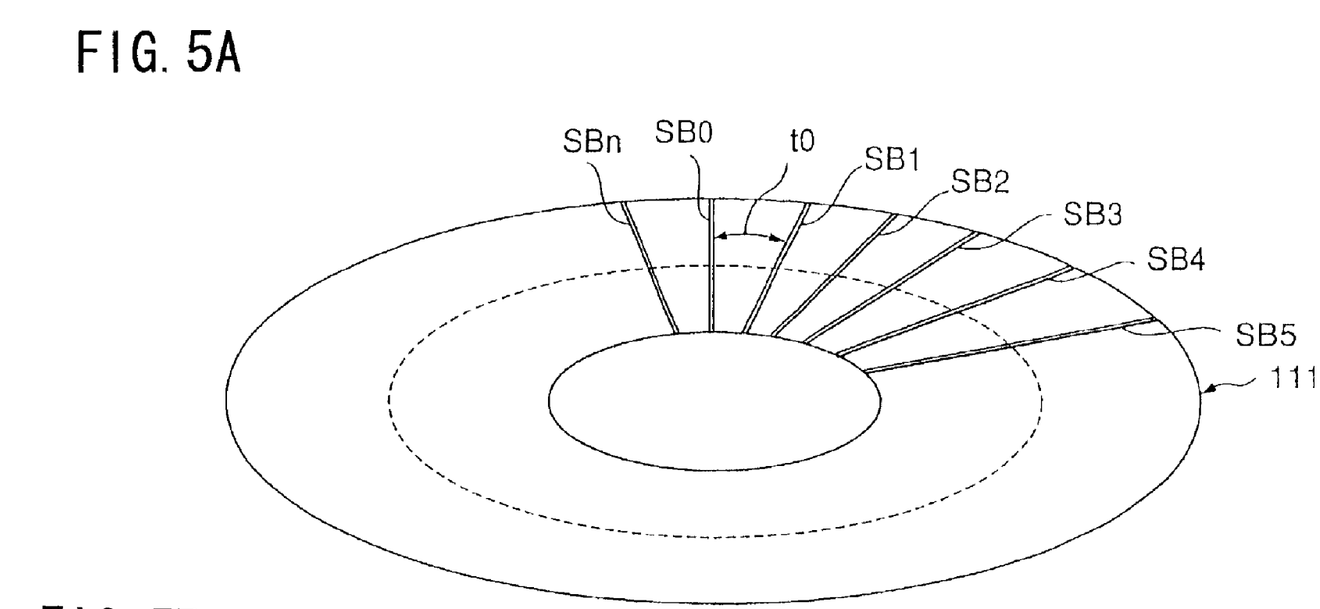
FIG. 5A and FIG. 5B are diagrams for explaining the format of a servo pattern of a disk.
Figure 5B:
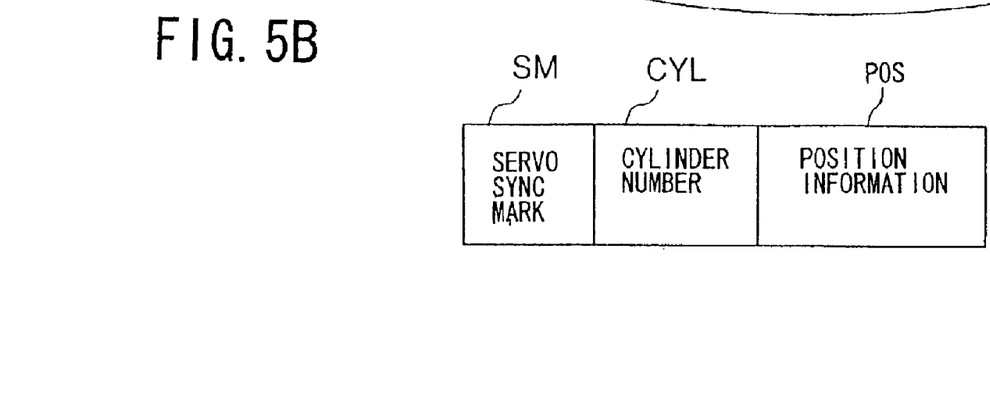

FIG. 5A and FIG. 5B show the format of servo pattern of the magnetic disk 111 that is used by the magnetic disk drive.

As shown in FIG. 5A, a sequence of servo pattern blocks SB0, SB1, . . . , SBn is recorded at given intervals "t0" in the magnetic disk 111. Normally, in the conventional disk apparatus, through the servo track writing (STW), the servo pattern blocks SB0, SB1, . . . , SBn are written, in advance, to the respective sectors of the magnetic disk 111.

As shown in FIG. 5B, each of the servo pattern blocks SB0, SB1, . . . , SBn is comprised of servo sync mark SM, cylinder number CYL, and position information POS. When one of the servo sync marks SM is detected, it is determined that a corresponding one of the servo pattern blocks SB0, SB1, . . . , SBn is detected. The cylinder number CYL of each servo pattern block is described by a gray code. The position information POS of each servo pattern block is described by a position error signal (PES) including a set of burst signals.

The servo pattern deviation correcting method and the disk apparatus of the present invention are embodied by utilizing the disk apparatus 100 shown in FIG. 4. Namely, in one preferred embodiment of the servo pattern deviation correcting method and the disk apparatus of the present invention, the servo pattern (the servo pattern blocks shown in FIG. 5) and a servo pattern deviation correction pattern (which will be described later) in the disk are detected by using the read channel (RDC) 125 of the printed circuit board 120 of the disk apparatus 100 of FIG. 4. The detection of the servo pattern deviation and the creation and writing of the servo pattern deviation correction pattern are carried out by the MPU 124, the RDC 125 and the SVC 126 of the disk apparatus 100 in accordance with program code instructions that are stored, in advance, in the ROM 123.

Next, a description will be given of one preferred embodiment of the servo pattern deviation correcting method of the present invention.

The servo pattern deviation correcting method of the present embodiment is executed by the disk apparatus 100 when writing the servo pattern blocks SB0 through SBn to the respective sectors of the disk. As described earlier, the disk apparatus 100 includes the read/write head 113 having the write head 113w and the read head 113r, the write head 113w writing information to the disk, and the read head 113r reading information from the disk.

Figure 6A:
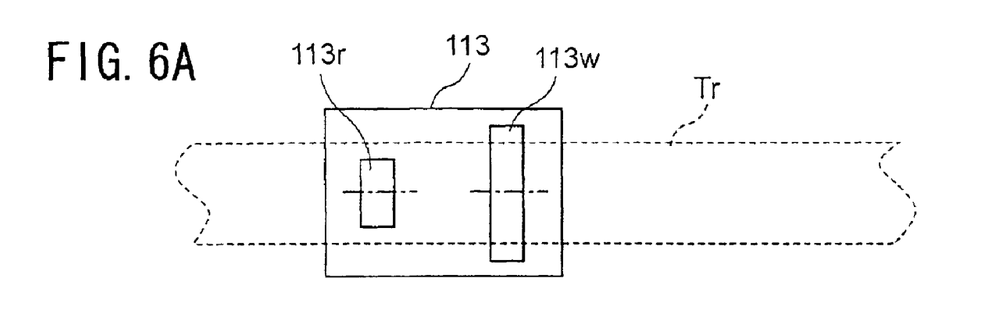
FIG. 6A, FIG. 6B and FIG. 6C are diagrams for explaining the conditions of a read/write head with respect to the direction of a target track of a disk.
Figure 6B:
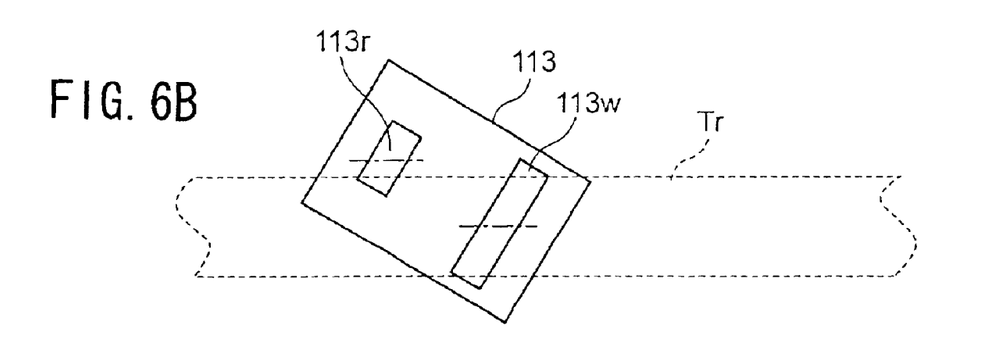
Figure 6C:
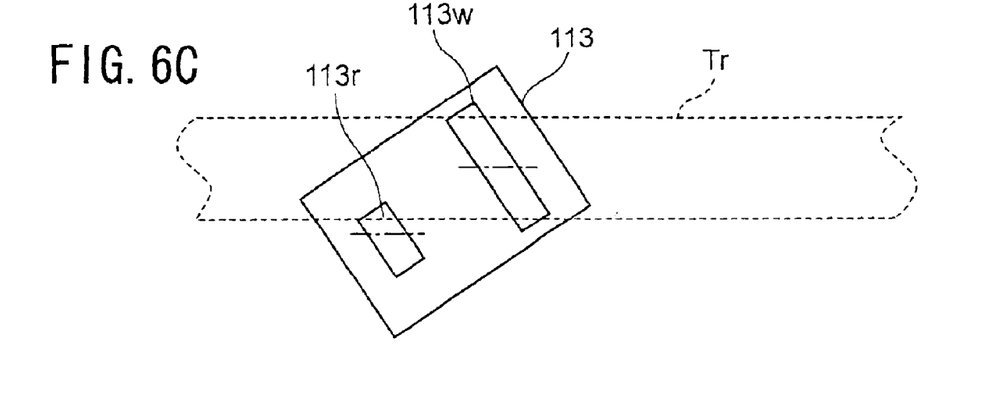

FIG. 6A, FIG. 6B and FIG. 6C show the conditions of the read head 113r and the write head 113w with respect to a target track Tr of the disk.

FIG. 6A shows the condition of the read/write head 113 when the head 113 is set in a parallel position to the direction of the track Tr. FIG. 6B and FIG. 6C show the conditions of the read/write head 113 when the head 113 is set in a slanted position to the direction of the track Tr.

The servo pattern deviation correcting method of the present embodiment is executed by the MPU 124, the RDC 125 and the SVC 126 of the disk apparatus 100 in accordance with the program code instructions stored in the ROM 123. In the following description, the MPU 124, the RDC 125 and the SVC 126 will be referred to as the control unit, for the sake of simplicity of description.

At a start of the servo pattern deviation correcting method, the control unit causes the write head 113w to write the servo pattern blocks ("SB0" through "SBn") to the respective sectors of the disk along the target track Tr of the disk. Each servo pattern block includes the servo sync mark, the gray code and the position error signal. This operation is the same as the servo track writing performed by the conventional disk apparatus.

In a second step, the control unit detects a deviation of each servo pattern block from the position of the track Tr in the transverse direction thereof. The deviation of each servo pattern block from the position of the track Tr in the transverse direction thereof may occur when the head 113 is set in a slanted position to the direction of the track Tr as shown in FIG. 6B and FIG. 6C and the servo pattern block is written to the disk by the write head 113w. Otherwise, the deviation may occur in the case shown in FIG. 2.

In a third step, the control unit creates a servo pattern deviation correction pattern (SPDCP) for each servo pattern block based on the deviation of the servo pattern block detected in the preceding step. The SPDCP created in this step is indicative of a correction amount of shifting of the head 113 in the transverse direction needed to eliminate the servo pattern deviation. The creation of the SPDCP may be performed only for the sectors of the disk where the detected deviation of the servo pattern block is larger than a predetermined deviation level. The SPDCP may be set to a fixed correction pattern for the sectors of the disk where the detected deviation of the servo pattern block is not larger than the predetermined deviation level.

In a fourth step, the control unit causes the write head 113w to write the SPDCP for each servo pattern block to a predetermined region of the disk between the servo pattern block and the data region along the track Tr.

In a fifth step, the control unit causes the read head 113r to read the SPDCP from the predetermined region of the disk for each servo pattern block, so that the control unit controls the head actuation mechanism (the VCM 115 and the arm 114) based on a sum of the position information derived from the servo pattern block and the correction amount derived from the SPDCP, so as to shift the read/write head 113 to a deviation-corrected position on the target track Tr. This operation may be performed by the control unit during the tracking control of the head 113 that is performed prior to the data reading operation or the data writing operation.

In the servo pattern deviation correcting method of the above-described embodiment, the deviation correction pattern (SPDCP) is created based on the detected deviation of the servo pattern block and written to the predetermined region between the servo pattern block and the data region along the target track. The head actuation mechanism is controlled based on the sum of the position information derived from the servo pattern block and the correction amount derived from the SPDCP, so as to shift the read/write head 113 to the deviation-corrected position on the target track Tr. Accordingly, the servo pattern deviation correcting method of the present embodiment is effective in accurately placing the read/write head 113 at the right position on the target track Tr even when the servo pattern deviation occurs.

Next, a description will be given of another embodiment of the servo pattern deviation correcting method of the invention using an improved process of writing the servo pattern deviation correction pattern (SPDCP) to the disk.

In the disk apparatus 100 shown in FIG. 3B, the movement of the arm 114 in the radial direction B of the disk, which is driven by the VCM 115, causes the read/write head 113 to be shifted in the direction B to the track Tr. The read/write head 113, which is located at the leading edge of the arm 114, is rotated or swung around the rotation shaft of the arm 114 over the disk 111. Hence, the direction of the head 113 with respect to the direction of the track Tr varies depending on whether the head 113 is shifted to the outer-position track of the disk or the inner-position track of the disk, as shown in FIG. 6B and FIG. 6C.

Further, in the read/write head 113 of this embodiment, the read head 113r and the write head 113w are arranged such that they are spaced apart from each other along the track of the disk. Hence, when the read/write head 113 is set in a slanted position to the direction of the track Tr, the portion of the disk which the read head 113r scans and the portion of the disk which the write head 113w scans differs from each other in the transverse direction of the disk. Further, due to variations of the manufacture, the centerline of the read head 113r on the read/write head 113 may deviate from the centerline of the write head 113w in the transverse direction thereof.

Figure 7A:
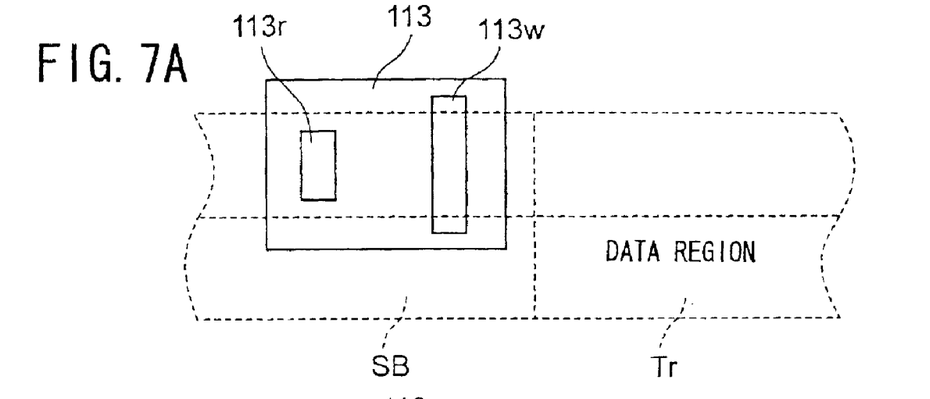
FIG. 7A, FIG. 7B and FIG. 7C are diagrams for explaining positional relationships between the servo pattern and the data region when the read/write head is set in a parallel position and when the read/write head is set in a slanted position.
Figure 7B:
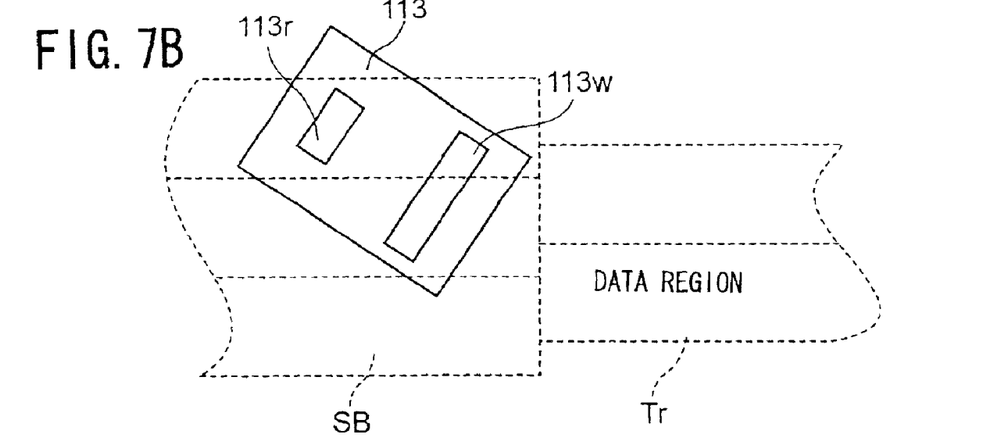
Figure 7C:
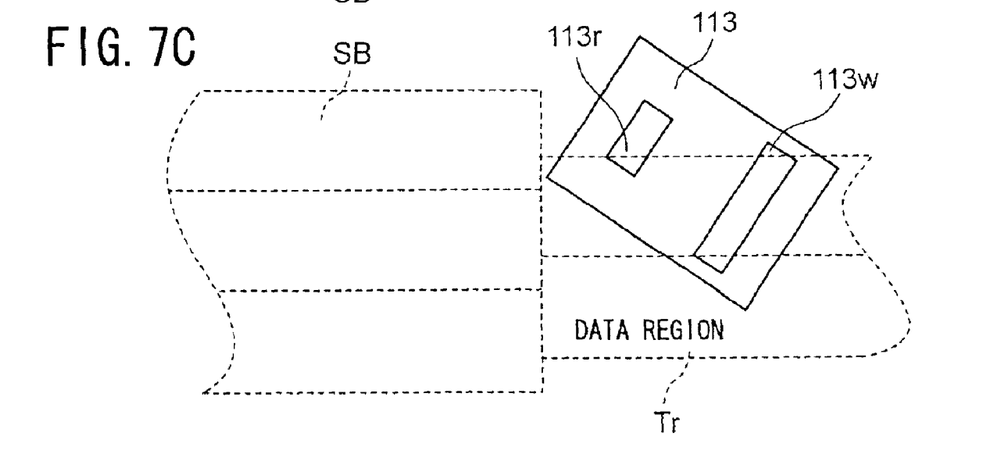

FIG. 7A, FIG. 7B and FIG. 7C show positional relationships between the servo pattern and the data region when the read/write head is set in a parallel position and when the read/write head is set in a slanted position.

FIG. 7A shows the positional relationship between the servo pattern SB and the data region when the head 113 is set in a parallel position with respect to the direction of the target track Tr. In this case, the servo pattern block SB is read by the read head 113r, and data is written to the disk by the write head 113w along the track Tr that accords with the line of the servo pattern block with no deviation in the transverse direction. Any deviation of the servo pattern SB from the position of the track Tr in the transverse direction does not occur.

FIG. 7B shows the positional relationship between the servo pattern SB and the data region when the head 113 is set in a slanted position and the servo pattern is read by the read head 113r. FIG. 7C shows the positional relationship between the servo pattern CB and the data region when the head 113 is set in the slanted position and data is written to the data region of the disk along the track Tr by the write head 113w.

As shown in FIG. 7C, the line of the data region where the data is written along the track Tr by the write head 113w deviates in the transverse direction from the line of the servo pattern SB that has been read by the read head 113r when the head 113 is set in the slanted position.

Similar to the case of the writing operation described above, when data is read from the disk and the head 113 is set in a slanted position, the line of the data region where data is read from the track Tr of the disk by the read head 113r deviates in the transverse direction from the line of the servo pattern SB that has been read by the read head 113r.

Figure 8A:
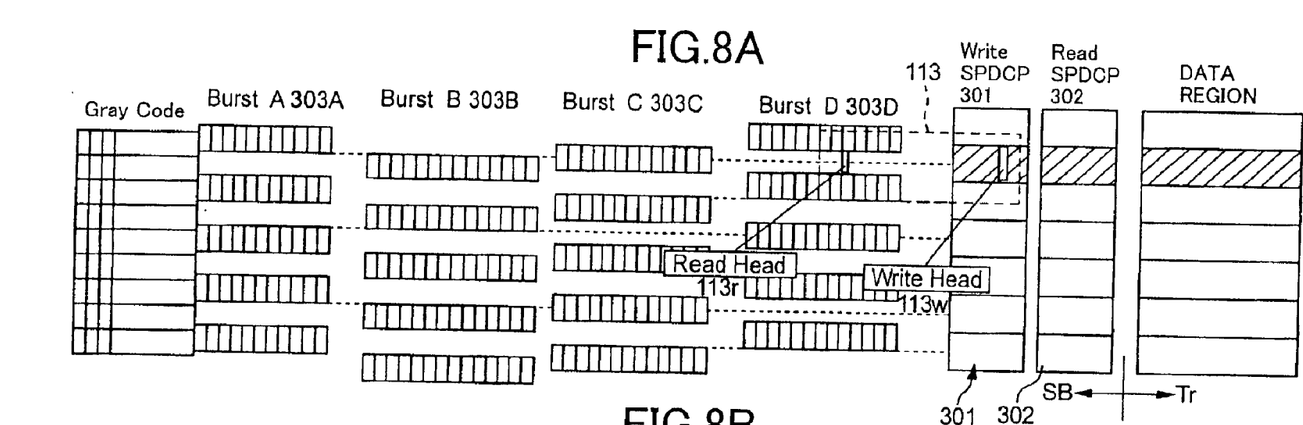
FIG. 8A and FIG. 8B are diagrams for explaining the format of a servo pattern deviation correction pattern of a disk.
Figure 8B:
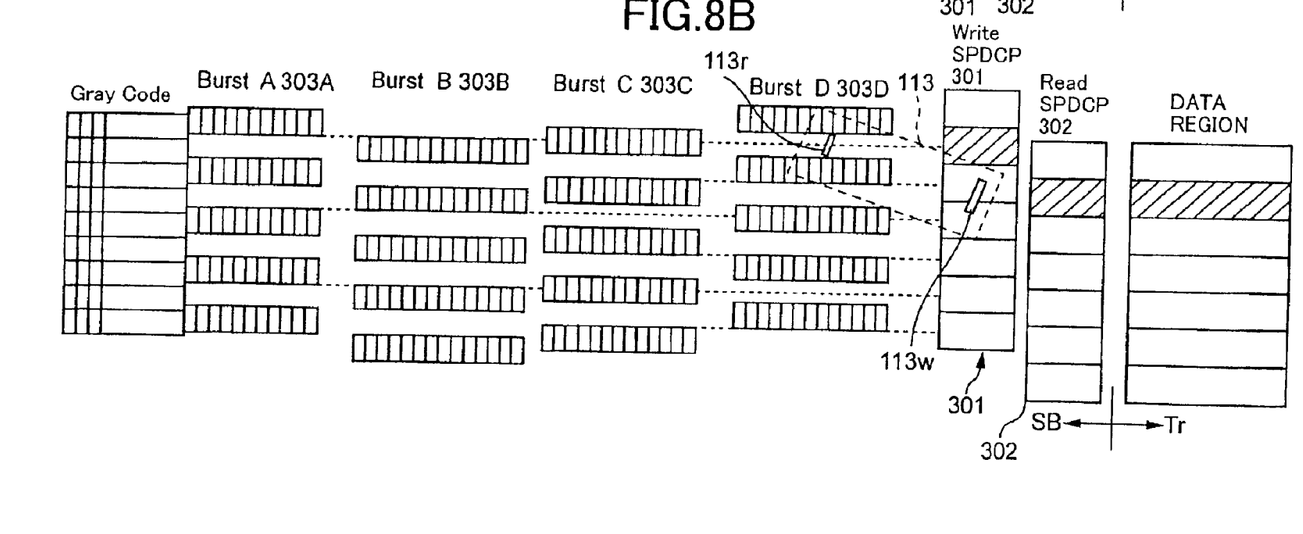

FIG. 8A and FIG. 8B show the format of one embodiment of the servo pattern deviation correction pattern (SPDCP) that is written to the disk according to the servo pattern deviation correcting method of the present invention.

FIG. 8A shows the format of the SPDCP that is written to the disk when the head 113 is set in a parallel position with respect to the direction of the track Tr. FIG. 8B shows the format of the SPDCP that is written to the disk when the head 113 is set in a slanted position with respect to the direction of the track Tr.

In the present embodiment, the SPDCP, which is written to the disk by the write head 113w of the disk apparatus 100 for one of the sectors of the disk, includes a first correction pattern (WRITE SPDCP) 301 and a second correction pattern (READ SPDCP) 302, the first correction pattern 301 being read when the write head 113w scans the track Tr to write data to the data region of the track Tr, and the second correction pattern 302 being read when the read head 113r scans the track Tr to read data from the data region of the track Tr. The first correction pattern 301 is written to the disk at a preceding position of the second correction pattern 302 along the track Tr. The writing position of the first correction pattern 301 follows the end of a set of burst patterns 303A, 303B, 303C and 303D along the track Tr.

Alternatively, the SPDCP, which is written to the disk by the write head 113w of the disk apparatus 100 for one of the sectors of the disk, may be provided such that the second correction pattern 302 is written to the disk at a preceding position of the first correction pattern 301 along the track Tr.

Alternatively, the SPDCP, which is written to the disk by the write head 113w of the disk apparatus 100 for one of the sectors of the disk, may include one of the first correction pattern 301 and the second correction pattern 302 for each of the sectors of the disk 111, the first correction pattern 301 being read when the write head 113w scans the track to write data to the disk 111, and the second correction pattern 302 being read when the read head 113r scans the track to read data from the disk 111.

As shown in FIG. 8A, when the head 113 is set in a parallel position, both the line of the first correction pattern 301 and the line of the second correction pattern 302 accord with the line of the data region where the data is written. However, as shown in FIG. 8B, when the head 113 is set in a slanted position, the line of the second correction pattern 302 deviates in the transverse direction from the line of the first correction pattern 301, and the line of the second correction pattern 302 accords with the line of the data region where the data is written.

In the servo pattern deviation correcting method of the present embodiment, the first correction pattern 301 is written to the disk 111 such that the read head 113r reads the first correction pattern 301 during the tracking control prior to the writing of data to the track by the write head 113w, and the write head 113w is located at an extended position along the track at the time of the reading of the first correction pattern 301 by the read head 113r.

Next, a description will be given of another embodiment of the servo pattern deviation correcting method of the invention. The servo pattern deviation correcting method of the present embodiment uses an improved process of writing the servo pattern deviation correction pattern (SPDCP) to the disk.

Figure 9:
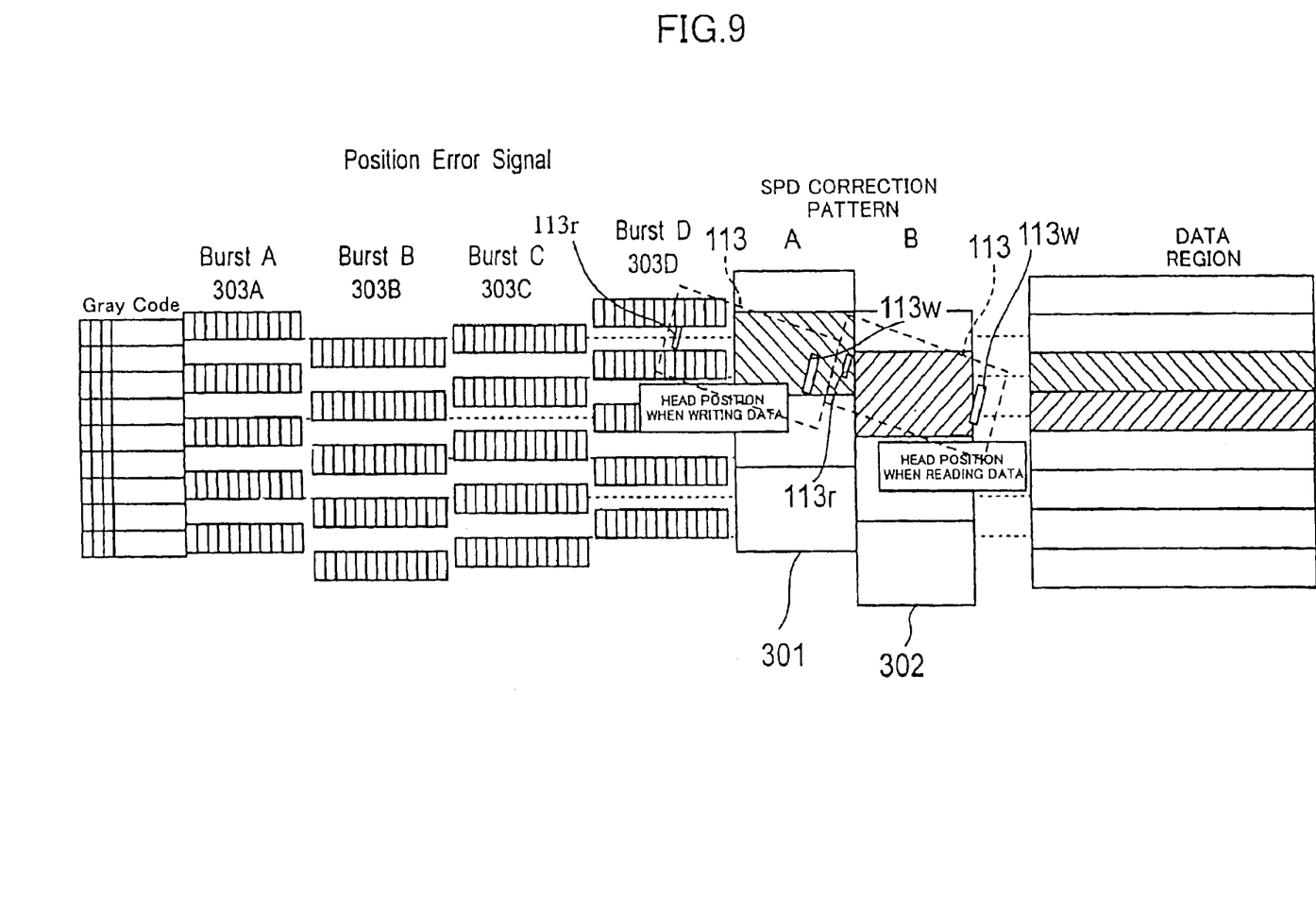
FIG. 9 is a diagram for explaining the format of a variation of the servo pattern deviation correction pattern.

FIG. 9 shows the format of a variation of the servo pattern deviation correction pattern (SPDCP) that is written to the disk by the write head of the disk apparatus 100 according to the servo pattern deviation correcting method of the present embodiment.

In the present embodiment, at a start of the servo pattern deviation correcting method, the control unit causes the write head 113w to write the servo pattern blocks ("SB0" through "SBn") to the respective sectors of the disk along the target track Tr of the disk.

In a second step, the control unit detects a deviation of each servo pattern block from the position of the track Tr in the transverse direction thereof. In this step, both the servo pattern block deviation when reading data from the disk and the servo pattern block deviation when writing data to the disk are detected.

In a third step, the control unit creates a servo pattern deviation correction pattern (SPDCP) for each servo pattern block based on the deviation of the servo pattern block detected in the preceding step. The SPDCP created in this step is indicative of a correction amount of shifting of the head 113 in the transverse direction needed to eliminate the servo pattern deviation. In this step, both the SPDCP (the first correction pattern 301) when writing data and the SPDCP (the second correction pattern 302) when reading data are created.

In a fourth step, the control unit causes the write head 113w to write the SPDCP (the first correction pattern 301 or the second correction pattern 302) for each servo pattern block to a predetermined region of the disk between the servo pattern block and the data region along the track Tr. As shown in FIG. 9, in the present embodiment, after the SPDCP is written, the control unit causes the write head 113w to be slightly shifted in the transverse direction (or in the radial direction of the disk), and the control unit causes the write head 113w to overwrite the same SPDCP to the same region of the disk along the track. After the second SPDCP is written, the same procedure is repeated as shown in FIG. 9.

In a fifth step, the control unit causes the read head 113r to read the SPDCP from the predetermined region of the disk for each servo pattern block, so that the control unit controls the head actuation mechanism (the VCM 115 and the arm 114) based on a sum of the position information derived from the servo pattern block and the correction amount derived from the SPDCP, so as to shift the read/write head 113 to a deviation-corrected position on the target track Tr.

In the servo pattern deviation correcting method of the above-described embodiment, the SPDCP is written to the disk such that each of the first and second correction patterns 301 and 302 have a transverse width greater than a transverse width of the data region of the track.

In the servo pattern deviation correcting method of the above-described embodiment, when writing the SPDCP to the disk for each servo pattern block, the write head 113w is shifted in the radial direction of the disk, so that the starting position of the SPDCP and the phase of the SPDCP on the disk are matched for the servo pattern block.

According to the servo pattern deviation correcting method of the above-described embodiment, the SPDCP (the second correction pattern 302) is used by the read head 113r when reading data from the disk, and the SPDCP (the first correction pattern 301) is used by the write head 113w when writing data to the disk.

In the servo pattern deviation correcting method of the above-described embodiment, the transverse width of each of the first and second correction patterns 301 and 302 is greater than the transverse width of the track. In order to avoid the overlapping of the correction patterns with respect to the adjacent tracks on the disk, the positions of the first and second correction patterns 301 and 302 are shifted from each other in the track direction of the disk.

Next, a description will be given of another embodiment of the servo pattern deviation correcting method of the invention. The servo pattern deviation correcting method of the present embodiment uses an improved process of writing the servo pattern deviation correction pattern (SPDCP) to the disk.

Figure 10:
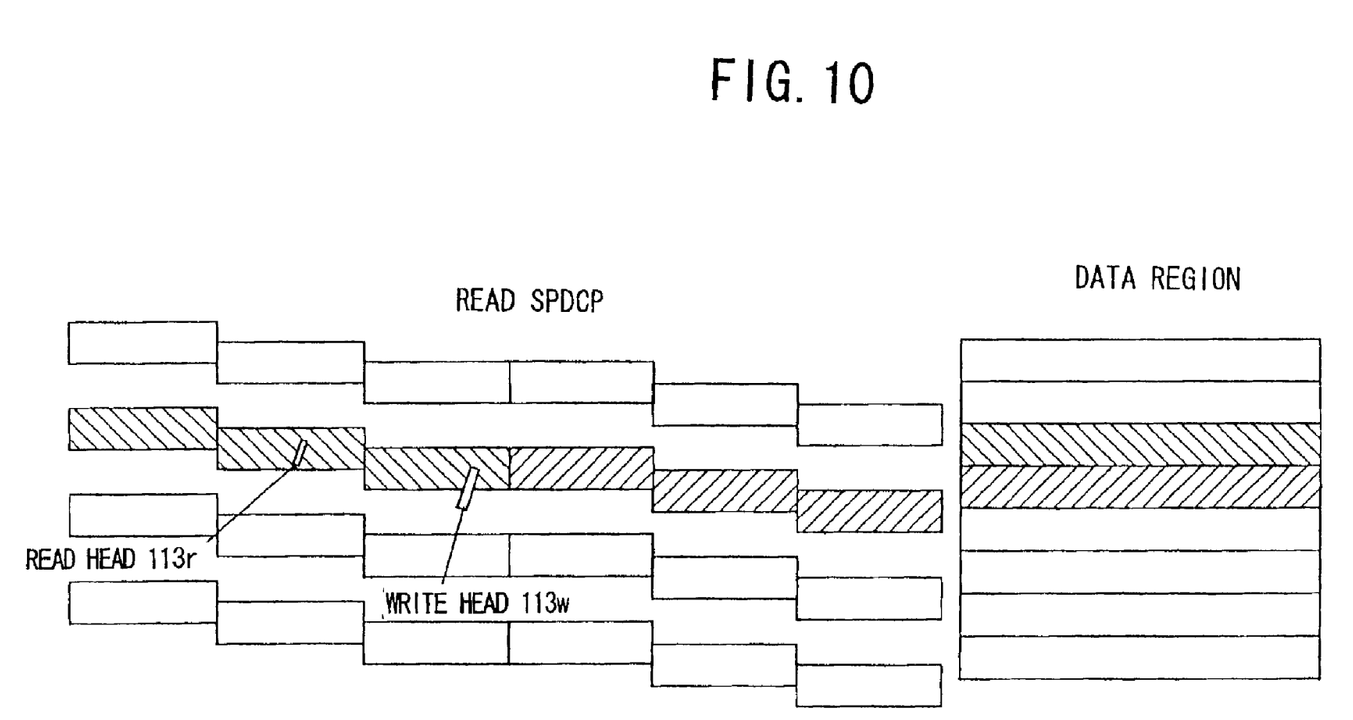
FIG. 10 is a diagram for explaining the format of another variation of the servo pattern deviation correction pattern.

FIG. 10 shows the format of another variation of the servo pattern deviation correction pattern (SPDCP) that is written to the disk by the write head of the disk apparatus 100 according to the servo pattern deviation correcting method of the present embodiment.

In the present embodiment, at a start of the servo pattern deviation correcting method, the control unit causes the write head 113w to write the servo pattern blocks ("SB0" through "SBn") to the respective sectors of the disk along the target track Tr of the disk.

In a second step, the control unit detects a deviation of each servo pattern block from the position of the track Tr in the transverse direction thereof.

In a third step, the control unit creates a servo pattern deviation correction pattern (SPDCP) for each servo pattern block based on the deviation of the servo pattern block detected in the preceding step. The SPDCP created in this step is indicative of a correction amount of shifting of the head 113 in the transverse direction needed to eliminate the servo pattern deviation.

In a fourth step, the control unit causes the write head 113w to write the SPDCP for one of the sectors of the disk to a predetermined region of the disk between the servo pattern block and the data region along the track Tr. As shown in FIG. 10, in the present embodiment, after the SPDCP is written, the control unit causes the write head 113w to be shifted at that position in the transverse direction by ½ of the transverse width of the data region of the track, and the control unit causes the write head 113w to continuously write the same SPDCP to the disk along the track. After the second SPDCP is written, the same procedure is repeated as shown in FIG. 10.

In a fifth step, the control unit causes the read head 113r to read the SPDCP from the predetermined region of the disk for each servo pattern block, so that the control unit controls the head actuation mechanism (the VCM 115 and the arm 114) based on a sum of the position information derived from the servo pattern block and the correction amount derived from the SPDCP, so as to shift the read/write head 113 to a deviation-corrected position on the target track Tr.

According to the above-described embodiment, it is possible to accurately place the read/write head 113 at the right position on the target track Tr even when the servo pattern deviation occurs. In the above-described embodiment, the transverse shifting of the write head 113w and the writing of the same SPDCP to the disk are repeated, and the transverse width of the SPDCP that is the same as the transverse width of the data region of the track remains unchanged.

Alternatively, the write head 113w may erase information in the predetermined region of the disk between the servo pattern block and the data region along the track, immediately before the write head 113w writes the SPDCP for one of the sectors of the disk to the predetermined region. In such alternative embodiment, the disk apparatus 100 includes the read/write head 113 having the write head 113w and the read head 113r, the write head 113w writing information to the disk and erasing the information on the disk, and the read head 113r reading information from the disk.

In the above-described embodiments, the SPDCP is provided for all of the respective servo pattern blocks "SB0" through "SBn" of the disk. Alternatively, the SPDCP may be provided for arbitrary ones of the respective servo pattern blocks "SB0" through "SBn" of the disk.

The present invention is not limited to the above-described embodiments, and variations and modifications may be made without departing from the scope of the present invention.

Further, the present invention is based on Japanese priority application No. 2001-039250, filed on Feb. 15, 2001, the entire contents of which are hereby incorporated by reference.

What is claimed is:

1. A servo pattern deviation correcting method which is executed by a disk apparatus having a read/write head including a write head and a read head, the write head writing information to a disk and the read head reading information from the disk, the method comprising the steps of:

writing servo pattern blocks to respective sectors of the disk along a target track of the disk through servo track writing, each servo pattern block containing a gray code and burst signals;

detecting a deviation of each servo pattern block written to the disk from a position of the target track in a transverse direction of the target track;

creating a servo pattern deviation correction pattern (SPDCP) for each servo pattern block based on the deviation of the servo pattern block;

writing the SPDCP for each servo pattern block to a predetermined region of the disk between the servo pattern block and a data region for each of said respective sectors, the SPDCP, written to the disk, being located along the target track immediately following the burst signals of the servo pattern block and preceding the data region; and reading the SPDCP from the predetermined region of the disk for each servo pattern block of each of said respective sectors, so that the read head and the write head are shifted to deviation-corrected positions on the target track based on both the servo pattern block and the SPDCP read from each of said respective sectors, such that the read head and the write head are capable of reading and/or writing to a data region in a same sector using a respective deviation-corrected position before said read head and said write head are shifted in a subsequent sector.

2. The servo pattern deviation correcting method according to claim 1, wherein the SPDCP includes correction patterns recorded onto the disk at positions that are shifted from the track in a radial direction of the disk.

3. The servo pattern deviation correcting method according to claim 1, wherein the SPDCP includes a first correction pattern and a second correction pattern for each of a plurality of sectors of the disk, the first correction pattern being read when the write head scans the track to write data to the disk, and the second correction pattern being read when the read head scans the track to read data from the disk.

4. The servo pattern deviation correcting method according to claim 3, wherein the first correction pattern for one of the plurality of sectors is written to the disk at a preceding position of the second correction pattern for said one of the plurality of sectors along the track.

5. The servo pattern deviation correcting method according to claim 3, wherein the second correction pattern for one of the plurality of sectors is written to the disk at a preceding position of the first correction pattern for said one of the plurality of sectors along the track.

6. The servo pattern deviation correcting method according to claim 1, wherein the SPDCP includes one of a first correction pattern and a second correction pattern for each of a plurality of sectors of the disk, the first correction pattern being read when the write head scans the track to write data to the disk, and the second correction pattern being read when the read head scans the track to read data from the disk.

7. The servo pattern deviation correcting method according to claim 3, wherein the first correction pattern is written to the disk such that the read head reads the first correction pattern prior to the writing of data to the track by the write head, and the write head is located at an extended position along the track at the time of the reading of the first correction pattern by the read head.

8. The servo pattern deviation correcting method according to claim 3, wherein the SPDCP is written to the disk such that each of the first and second correction patterns have a transverse width greater than a transverse width of a data region of the track.

9. The servo pattern deviation correcting method according to claim 3, wherein, when writing the SPDCP to the disk for each servo pattern block, the write head is shifted in a radial direction of the disk, so that a starting position of the SPDCP and a phase of the SPDCP on the disk are matched for the servo pattern block.

10. The servo pattern deviation correcting method according to claim 3, wherein the second correction pattern is used by the read head when reading data from the disk, and the first correction pattern is used by the write head when writing data to the disk.

11. The servo pattern deviation correcting method according to claim 3, wherein the positions of the first and second correction patterns are shifted from each other in a track direction of the disk, in order to avoid the overlapping of the SPDCP with respect to adjacent tracks on the disk.

12. The servo pattern deviation correcting method according to claim 1, wherein the deviation correction pattern is provided for all or arbitrary ones of the respective servo pattern blocks of the disk.

13. A disk apparatus which includes:

a read/write head including a write head and a read head, the write head writing information to a disk, the read head reading information from the disk;

a head actuation mechanism shifting the read/write head in a radial direction of the disk to a target track of the disk; and a control unit controlling the read/write head and the head actuation mechanism, the control unit executing a servo pattern deviation correcting method by controlling the read/write head and the head actuation mechanism based on a servo pattern and a deviation correction pattern that are read from the disk, wherein the control unit comprises:

a first means for causing the write head to write servo pattern blocks to respective sectors of the disk along a target track of the disk through servo track writing, each servo pattern block containing a gray code and burst signals;

a second means for causing the control unit to detect a deviation of each servo pattern block written to the disk from a position of the target track in a transverse direction of the target track;

a third means for causing the control unit to create a servo pattern deviation correction pattern (SPDCP) for each servo pattern block based on the detected deviation of the servo pattern block;

a fourth means for causing the write head to write the SPDCP for each servo pattern block to a predetermined region of the disk between the servo pattern block and a data region for each of said respective sectors, the SPDCP, written to the disk, being located along the track immediately following the burst signals of the servo pattern block and preceding the data region; and a fifth means for causing the read head to read the SPDCP from the predetermined region of the disk for each servo pattern block of each of said respective sectors, so that the control unit controls the head actuation mechanism based on both the servo pattern block and the SPDCP read from each of said respective sectors, so as to shift the read/write head to a deviation-corrected position on the target track, such that the read head and the write head are capable of reading and/or writing to a data region in a same sector using a respective deviation-corrected position before said read head and said write head are shifted in a subsequent sector.

14. The disk apparatus according to claim 13, wherein the SPDCP includes correction patterns recorded onto the disk at positions that are shifted from the track in a radial direction of the disk.

15. The disk apparatus according to claim 13, wherein the SPDCP includes a first correction pattern and a second correction pattern for each of a plurality of sectors of the disk, the first correction pattern being read when the write head scans the track to write data to the disk, and the second correction pattern being read when the read head scans the track to read data from the disk.

16. A servo pattern deviation correcting method which is executed by a disk apparatus having a read/write head including a write head and a read head, the write head writing information to a disk and erasing information on the disk, the read head reading information from the disk, the method comprising the steps of:

writing servo pattern blocks to respective sectors of the disk along a target track of the disk through servo track writing, each servo pattern block containing a gray code and burst signals;

detecting a deviation of each servo pattern block written to the disk from a position of the target track in a transverse direction of the target track;

creating a servo pattern deviation correction pattern (SPDCP) for each servo pattern block based on the detected deviation of the servo pattern block;

erasing information in a predetermined region of the disk between the servo pattern block and a data region along the target track for each of said respective sectors prior to writing the SPDCP to the disk;

writing the SPDCP for each servo pattern block to the predetermined region, the SPDCP, written to the disk, being located along the target track immediately following the burst signals of the servo pattern block and preceding the data region for each of said respective sectors; and reading the SPDCP from the predetermined region of the disk for each servo pattern block of each of said respective sectors, so that the read head and the write head are shifted to deviation-corrected positions on the target track based on both the servo pattern block and the SPDCP read from each of said respective sectors, such that the read head and the write head are capable of reading and/or writing to a data region in a same sector using a respective deviation-corrected position before said read head and said write head are shifted in a subsequent sector.

* * * * *